United States Patent [19]

Sato

[11] Patent Number: 5,174,239
[45] Date of Patent: Dec. 29, 1992

[54] SEALED-TYPE AQUARIUM DEVICE

[75] Inventor: Takeo Sato, Tokyo, Japan

[73] Assignee: Sato Kogei Kabushiki Kaisha, Tokyo, Japan

[21] Appl. No.: 703,823

[22] Filed: May 21, 1991

[51] Int. Cl.⁵ ............... A01K 61/02; A01K 63/00
[52] U.S. Cl. .................. 119/5; 119/51.04; 40/406
[58] Field of Search ............ 119/5, 51.04; 40/406, 40/407, 408, 439, 440, 441

[56] References Cited

U.S. PATENT DOCUMENTS

| | | | |
|---|---|---|---|
| 1,741,692 | 12/1929 | Garaja | 40/406 |
| 2,966,885 | 1/1961 | Bentley | 119/51.04 |
| 3,168,887 | 2/1965 | Bodell | 119/5 |
| 3,283,743 | 11/1966 | Dibelins | 119/5 |
| 3,374,771 | 3/1968 | Michie et al. | 119/5 |
| 3,609,343 | 9/1971 | Howlett | 119/5 |
| 3,795,225 | 3/1974 | Ogui | 119/5 |
| 4,156,401 | 5/1979 | Ogui | 119/5 |
| 4,490,931 | 1/1985 | Fleemin | 40/406 |

FOREIGN PATENT DOCUMENTS 3039029 5/1982 Fed. Rep. of Germany .......... 119/5
2546374 11/1984 France ................................. 119/5

Primary Examiner—Gene Mancene
Assistant Examiner—Todd E. Manahan
Attorney, Agent, or Firm—Oblon, Spivak, McClelland, Maier & Neustadt

[57] ABSTRACT

A sealed-type aquarium device capable of permitting a viewer to feel unexpected and marvelous interest in addition to enjoyment through observation of fish. The aquarium device includes a sealed aquarium body which is constructed so as to prevent air from being introduced into the aquarium body. Water cleaned through a filtering unit is fed under pressure through a feed pipe to the aquarium body by a feed pump, so that a water pressure in the aquarium body is increased to cause water polluted in the aquarium body to be forcibly discharged through a drain pipe to the filtering unit. The aquarium body may be formed into any desired shape.

10 Claims, 4 Drawing Sheets

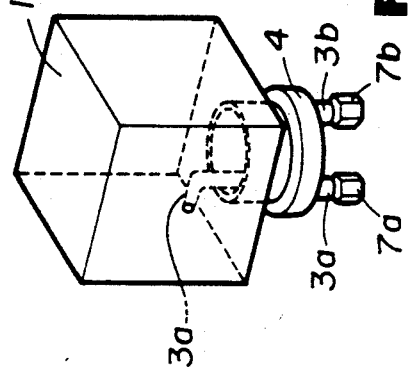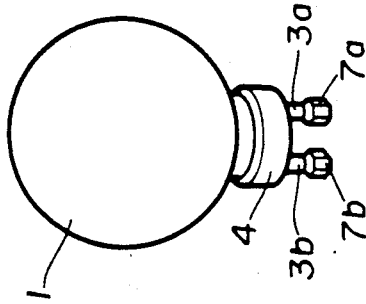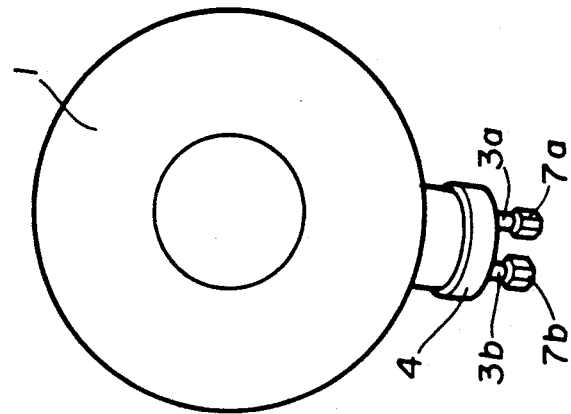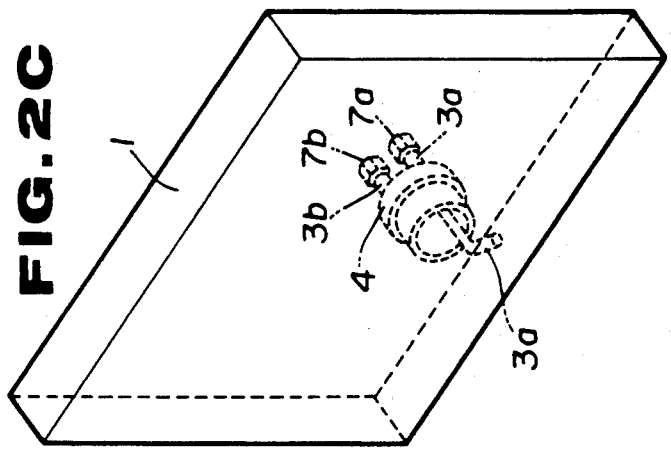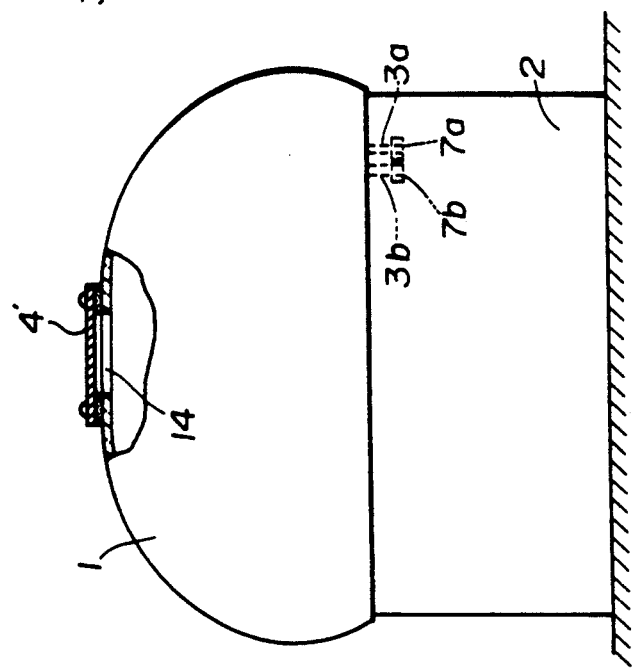

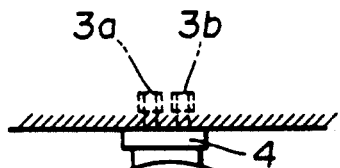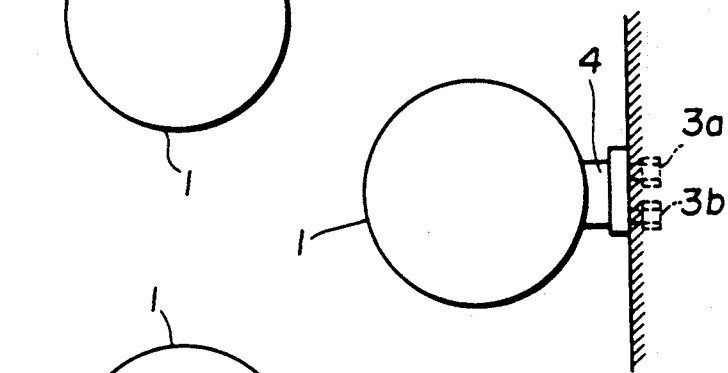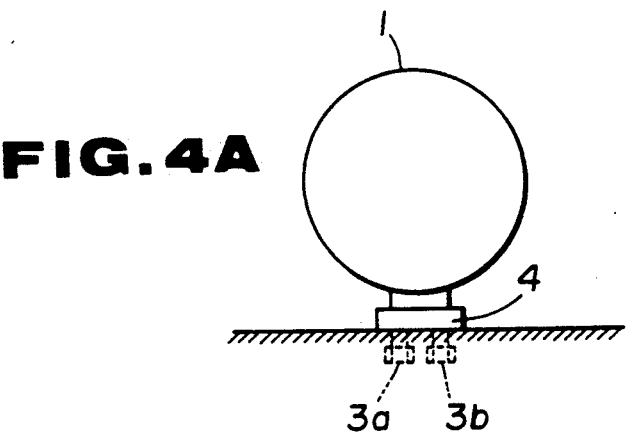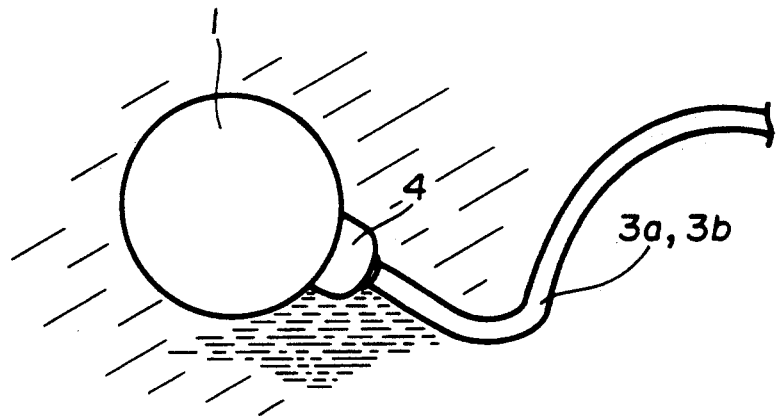

SEALED-TYPE AQUARIUM DEVICE

BACKGROUND OF THE INVENTION

This invention relates to a sealed-type aquarium device for fish for enjoyment, and more particularly to an aquarium device for enjoyment fish such as goldfish, tropical fish, aquatic animals or plants, or the like which is constructed in a fully water-tight and air-tight manner except sections of a water tank or aquarium body to which a feed pipe and a drainage pipe are connected.

The words "fish for enjoyment" or "enjoyment fish" used herein are referred to fish such as goldfish, tropical fish or other aquatic animals or plants which are capable of delighting the eye.

A water tank or aquarium body of a conventional aquarium device for enjoyment fish is generally constructed into a well-known geometric shape such as a rectangular shape, or the like. Accordingly, the conventional aquarium device only interest the viewer because of the fish contained therein and not because of the shape of the aquarium.

SUMMARY OF THE INVENTION

The present invention has been made in view of the foregoing disadvantage of the prior art while taking notice of the fact that even when a vessel, which is formed with a narrow mouth such as is typically seen in a narrow-mouthed glass bottle, and filled with liquid such as water, or the like, is inverted, the liquid cannot be discharged from the vessel irrespective of the size and volume of the vessel so long as air is not introduced into the vessel.

Accordingly, it is an object of the present invention to provide a sealed-type aquarium device for fish for enjoyment which is capable of permitting a viewer to feel unexpected interest and enjoyment in addition to enjoyment through observation of fish.

It is another object of the present invention to provide a sealed-type aquarium device which is capable of creating a marvelous atmosphere.

It is a further object of the present invention to provide a sealed-type aquarium device which is capable of being installed in any desired orientation at any desired location.

It is still another object of the present invention to provide a sealed-type aquarium device which is capable of keeping an environment suitable for raising fish for a long period of time without renewing water.

It is yet another object of the present invention to provide a sealed-type aquarium device which is capable of providing fish with a bait.

It is a still further object of the present invention to provide a sealed-type aquarium device which is capable of readily controlling water pressure.

It is a yet further object of the present invention to provide a sealed-type aquarium device which is capable of exhibiting an advertising or propaganda function.

In accordance with the present invention, a sealed-type aquarium device for enjoyment when viewing fish is provided. The aquarium device includes a water tank or aquarium body constructed in a sealed manner and a filtering unit for purifying water by filtration. The filtering unit is arranged separate from the aquarium body and includes a feed pump. The aquarium device also includes a feed pipe and a drainage pipe, each arranged between the aquarium body and the filtering unit for connecting the aquarium body and filtering unit to each other therethrough. The feed pump permits water, purified through the filtering unit, to be fed through the feed pipe into the aquarium body under pressure, to thereby increase a water pressure in the aquarium body to a degree sufficient to cause water polluted in the aquarium body to be forcibly discharged from the aquarium body through the drainage pipe to the filtering unit, resulting in water being circulated through the aquarium device while being filtered.

As described above, in the present invention, the aquarium body is sealedly constructed so as to prevent air from being introduced into the aquarium body even when it is inverted. Water purified or cleaned through the filtering unit is fed under pressure through the feed pipe to the aquarium body by means of the feed pump of the filtering unit. This results in a water pressure in the aquarium body being increased to cause water polluted in the aquarium body to be forcibly discharged through the drainage pipe to the filtering unit, in which the polluted water is subject to filtration and then fed through the feed pipe to aquarium body, so that water is circulated through the device while being filtered.

BRIEF DESCRIPTION OF THE DRAWINGS

These and other objects and many of the attendant advantages of the present invention will be readily appreciated as the same becomes better understood by reference to the accompanying drawings, in which like reference numerals designate like or corresponding parts throughout; wherein:

FIG. 2A is a perspective view showing a spherical aquarium body;

FIG. 2B is a perspective view showing a rectangular parallelepiped aquarium body;

FIG. 2C is a perspective view showing a panel-type aquarium body;

FIG. 2D is a perspective view showing a donut-shaped aquarium body;

FIG. 2E is a front elevation view showing a large-sized hemispherical aquarium body;

FIG. 4A is a schematic view showing an aquarium body located on a horizontal plane such as a floor or the like;

FIG. 4B is a schematic view showing an aquarium body sidewise located on a vertical plane such as a wall or the like;

FIG. 4C is a schematic view showing an aquarium body downward mounted on a horizontal plane such as a ceiling or the like; and FIG. 4D is schematic view showing an aquarium body kept left on a floor or the like.

DETAILED DESCRIPTION OF THE PREFERRED EMBODIMENT

Figure 1:
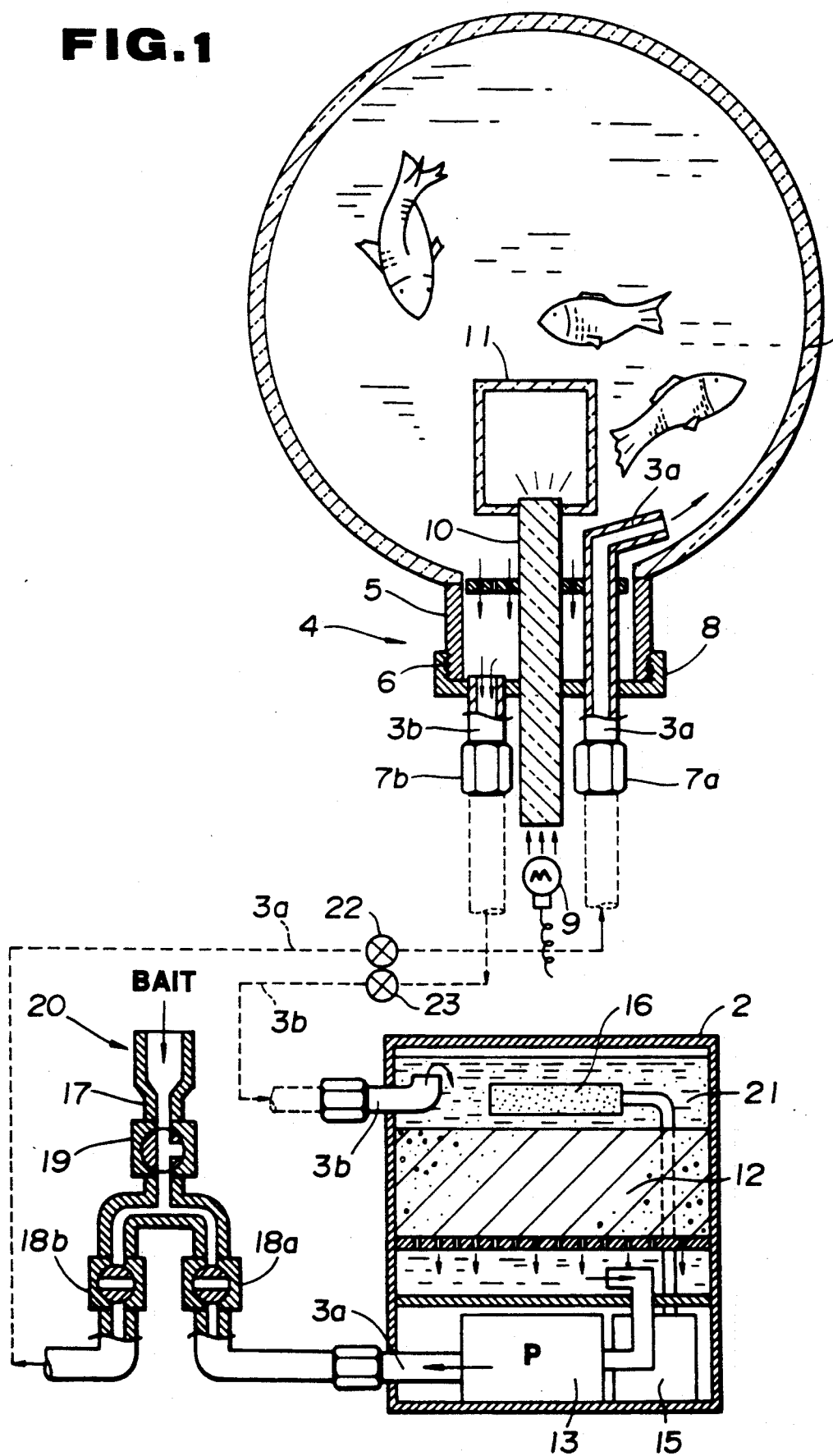
FIG. 1 is a vertical sectional view generally showing an embodiment of a sealed-type aquarium device for fish for enjoyment according to the present invention.

Now, a sealed-type aquarium device for enjoyment while viewing fish according to the present invention will be described hereinafter with reference to the accompanying drawings.

A sealed-type aquarium device of the present invention generally includes a water tank or aquarium body 1 constructed in a sealed manner, a filtering unit 2 arranged separate from the aquarium body 1 for purifying water by filtration and including a feed pump 13, a feed pipe 3a and a drainage pipe 3b for connecting the aquarium body 1 and the filtering unit 2 to each other, the feed pump 13 being adapted to permit water purified through the filtering unit 2 to be fed through the feed pipe 3a to the aquarium body 1 under pressure, to thereby increase a water pressure in the aquarium body 1 to a degree sufficient to cause water polluted in the aquarium body 1 to be forcibly discharged through the drainage pipe 3b to the filtering unit 3, resulting in water being circulated through the aquarium device while being filtered.

The connection between the aquarium body 1 and the feed pipe 3a and drainage pipe 3b may be carried out using a suitable means. In order to ensure maintenance of the aquarium body 1, it is required to renew water in the aquarium body 1 and carry out the insertion and removal of fish with respect to the aquarium body 1. For this purpose, the aquarium body 1 is provided with a socket 4 which is formed into a predetermined diameter (for example, 10 cm) and a suitable shape such as a short cylindrical shape. Alternatively, a sealing lid 4' may be provided on the aquarium body 1 as shown in FIG. 2E.

The socket 4 may be constructed, for example, by mounting, on the aquarium body 1, a short cylinder 5 communicating with the interior of the aquarium body 1. The cylinder 5 is formed into a predetermined diameter and provided at the distal end thereof with a threaded portion 6. Then, to the threaded portion 6 is threadedly connected a threaded lid 8 provided with fittings 7a and 7b for connecting the feed pipe 3a and drainage pipe 3b therethrough to the lid 8, as shown in FIG. 1. The sealing lid 4' may be detachably mounted at the aquarium body 1 so as to cover an aperture 14 formed at the aquarium body 1, as shown in FIG. 2E.

The aquarium body 1 may be formed into any desired configuration and size so long as it permits the aquarium body to be constructed in a sealed manner. For example, it may be formed into a shape such as a spherical shape (FIGS. 1 and 2A), a large-sized hemispherical shape (FIG. 2E), a rectangular parallelepiped shape (FIG. 2B), a cubic shape, a panel-like shape for wall mounting, architrave mounting or the like (FIG. 2C), a donut-like shape (FIG. 2D), or the like.

Figure 3C:
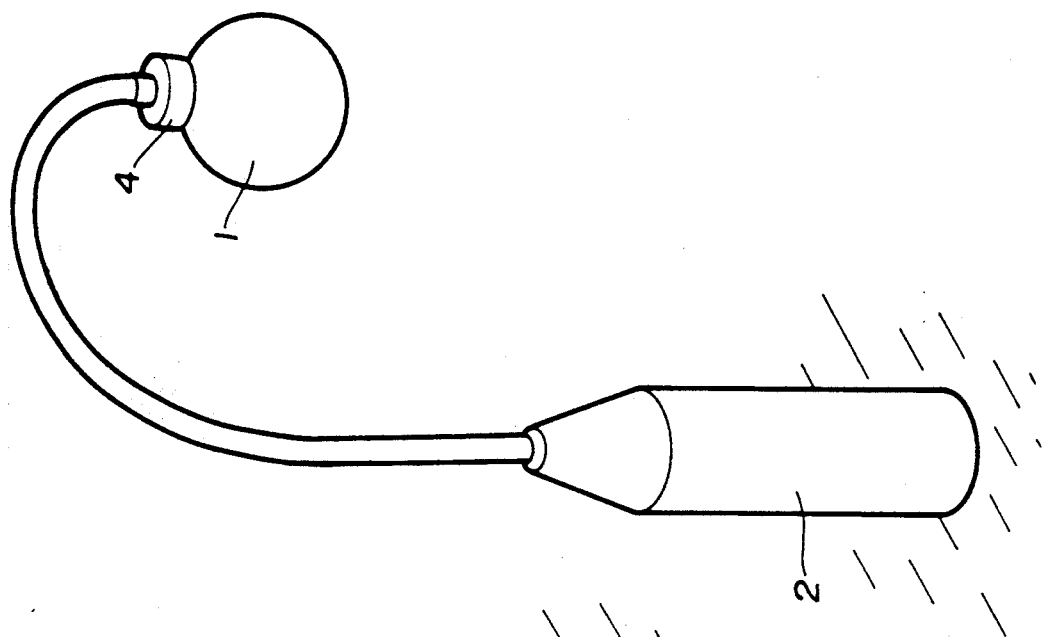
FIG. 3C is a perspective view showing a sealed-type aquarium device of the present invention which is constructed into another stand-type assembly.
Figure 3B:
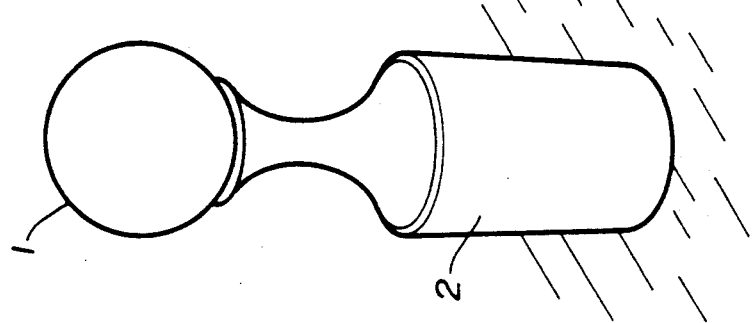
FIG. 3B is a perspective view of the stand-type aquarium aquarium device shown in FIG. 3A.
Figure 3A:
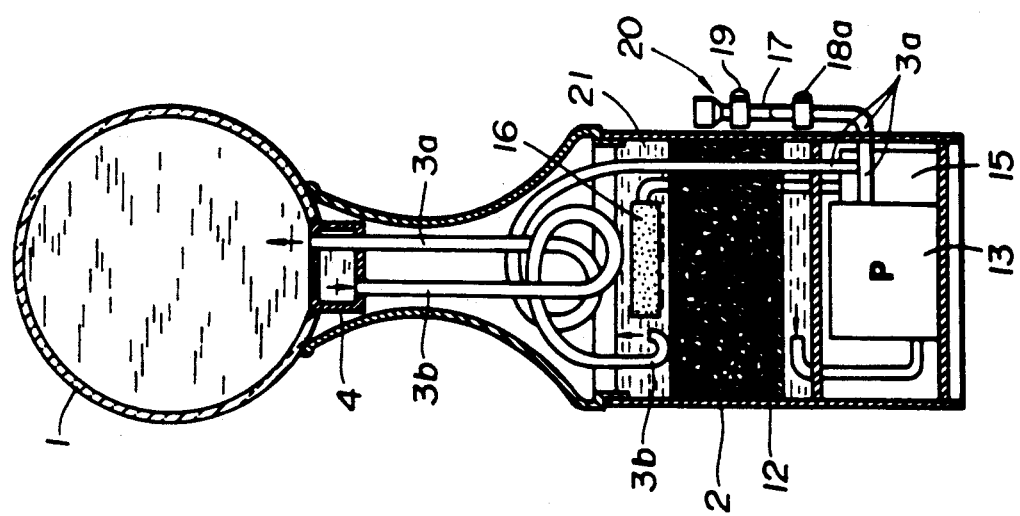
FIG. 3A is a vertical sectional view showing a sealed-type aquarium device of the present invention which is integrated into a stand-type assembly.

The aquarium body 1 and filtering unit 2 may be arranged in proximity to each other or in a manner to be remote from each other, so long as they are connected to each other by means of the feed pipe 3a and drainage pipe 3b which may be considered to be equivalent to a water pipe, a water hose, a cable or the like conventionally used. For example, as shown in FIGS. 3A to 3C, the aquarium body 1 and filtering unit 2 may be assembled into a single stand-type structure, so that they are in proximity to each other. Alternatively, as shown in FIGS. 4A to 4D, they may be remotely spaced from each other by connecting both to each other through the feed pipe 3a and drainage pipe 3b.

FIG. 4A shows an example wherein the aquarium body 1 of a spherical shape is erectly placed on a horizontal plane such as a floor, or the like; FIG. 4B shows another example wherein the spherical aquarium body 1 is mounted on a vertical plane such as a wall, or the like; FIG. 4C shows a further example wherein the spherical aquarium body 1 is hung on a horizontal plane such as a ceiling, or the like; and FIG. 4D shows still another example wherein the spherical aquarium body 1 is on a horizontal plane such as a floor, without any rigid connection to the floor, like a soccer ball.

Each of the feed pipe 3a and drainage pipe 3b may selectively use a rigid pipe or a soft and flexible pipe depending upon the purpose.

In the filtering unit 2 is arranged an aerator which may comprise an air-stone 16 connected to an air pump 15 or the like. For example, the air-stone 16 may be arranged in a storage chamber 21 defined above a filter medium 12 in the filtering unit 2 so as to store polluted water discharged from the aquarium body 1 through the drainage pipe 3b to the filtering unit 2. Thus, the whole polluted water may be subject to aeration or exposed to a large amount of air bubbles ejected from the air-stone 16, as shown in FIGS. 1 and 3A.

The feed pipe 3a is provided with a branch pipe 17, which includes a bait feeding section 20 provided with a three-way valve 19. The bait feeding section 20 is provided with an upper open end through which a bait is charged into the section 20. Also, it is provided with on-off valves 18a and 18b in a manner to interpose the branch pipe 17 therebetween.

If required, the feed pipe 3a and drainage pipe 3b may be provided with flow control valves 22 and 23, respectively, so that both valves 22 and 23 and the feed pump 13 may be controlled to adjust a ratio of the rate of feed of water to the aquarium body 1 to that of discharge of water therefrom, to thereby adjust a water pressure in the aquarium body 1 to a desired level such as, for example, a high level suitable for raising a deep-sea fish such as a sea bream.

It is a matter of course that the aquarium device of the illustrated embodiment delights a viewer when it is used in a conventional manner of putting fish in the aquarium body 1 filled with water and placing it at any desired location. In addition to the above, the aquarium device of the illustrated embodiment permits a viewer to feel unexpected interest and enjoyment when the interior of the aquarium body 1 is illuminated. For this purpose, the illustrated embodiment is so constructed that a light source 9, such as an electric bulb, is arranged in the socket 4 to illuminate the interior of the aquarium body 1.

It is well known in the art that when light impinges on the proximal end surface of a light-permeable element formed of a transparent glass or plastic material shaped like a solid rod, plate or wire, the light passes through the light-permeable element to permit it to exhibit bright and beautiful luminance from the distal end surface thereof.

In view of such a fact, in the illustrated embodiment, a light-permeable element 10 of the above-described type is arranged in such a manner that the distal end surface thereof acting as a light-emitting surface is positioned in the aquarium body 1 through the socket 4. Also, a light source 9, such as an electric bulb, is provided below the lower end surface of the light-permeable element 10, so that light emitted from the light source 9 may pass through the light-permeable element 10, resulting in light being discharged from the distal end surface of the element 10 acting as a luminous surface.

Such construction permits not only fish for enjoyment to be put in the aquarium body 1, but decorative or display articles such as an artificial flower, artificial jewelry and the like to be placed in the aquarium body 1 and illuminated, so that a viewer may feel increased pleasure and interest. Also, in the illustrated embodiment, such decorative or display articles may be put in the water in the aquarium body 1 directly, or through a hollow capsule 11 received in the water.

The hollow capsule 11 may be provided on the outer surface thereof with a suitable decorative or display means such as patterns and/or characters of beautiful coloring, a film on which such patterns and/or characters reside. When the decorative or display means is illuminated, it may be clearly and beautifully visualized in the water, so that the aquarium device of the illustrated embodiment may exhibit a atmosphere creating function, a display function, an advertising or propaganda function, and the like.

Now, the manner of operation of the aquarium device of the illustrated embodiment constructed as described above will be described hereinafter.

First, the water tank or aquarium body 1 is filled with water while the sealing lid 4' is removed from the aquarium body 1, or the aquarium body 1 is placed so that the socket 4 is upward, and then fish for enjoyment are placed in the aquarium body 1 and the hollow capsule 11 is arranged therein. Subsequently, the threaded lid 8 is fitted on the threaded portion 6 of the short cylinder 5 of the socket 4 and then the feed pipe 3a and drainage pipe 3b are connected to the couplings 7a and 7b, respectively, to thereby connect the aquarium body 1 to the filtering unit 2. Thereafter, the sealing lid 4 is threadedly put on the aquarium body 1.

Then, when the filtering unit 2 is driven, water cleaned or purified by filtration at the filtering unit 2 is forcibly fed under pressure through the feed pipe 3a to the aquarium body 1 by means of the feed pump 13, so that a water pressure in the aquarium body 1 is increased to a degree sufficient to permit water polluted in the aquarium body 1 to be forced from the aquarium body 1 to the drainage pipe 3 and then forcibly discharged to the storage chamber 21 defined above the filter medium 12 in the filtering unit 2. Then, the dirty water is exposed to air bubbles produced from the airstone means 16 and then subject to filtering through the filter medium 12, resulting in it being purified or cleaned. Then, it is returned to the aquarium body 1 under pressure by means of the feed pump 13, resulting in water being circulated while being filtered. Thus, water in the aquarium body 1 is kept at a condition suitable for raising fish for enjoyment.

For the purpose of feeding fish for enjoyment with a bait, the valves of the bait feeding section 20 are operated.

First, when the bait feeding section 20 is kept at a normal state wherein the on-off valves 18a and 18b are kept open and the three-way valve 19 is kept closed, water purified by filtering and fed by the feed pump 13 flows through the on-off valves 18a and 18b. Feeding of the fish is carried out by charging the bait feeding section 20 with a bait through the upper open end of the bait feeding section 20 after closing the on-off valves 18a and 18b and then opening the three-way valve 19 as shown in FIG. 1. Thereafter, the three-way valve 19 is operated so as to permit one way thereof to communicate with the opening and then the on-off valves 18a and 18b are opened, resulting in purified water flowing through the feed pipe 3a again to cause the charged bait to be supplied to the aquarium body 1.

The reason why the closing of the three-way valve 19 is carried out so as to cause one way thereof to communicate with the opening as described above is to prevent bait remaining in the valve 19 when it is closed from producing putrid smell due to decomposition while the three-way valve 19 is kept open.

A water pressure in the aquarium body 1 may be controlled through the flow control valves 22 and 23 and/or feed pump 13. For example, when the valve 22 is open to increase the feed rate of water, and the valve 23 is throttled or the feed pump 13 is increased in feed pressure; the water pressure is increased. This permits the water pressure to be adjusted to a level suitable for raising a deep-sea fish such as a sea bream or the like.

Also, turning-on of the light source 9 causes the interior of the aquarium body 1 and the hollow capsule 11 to be illuminated.

When the maintenance of the aquarium body, 1 such as renewing of water, putting-in and out of fish for enjoyment, arrangement of the hollow capsule, or the like is required, the sealing lid 4' is removed from the aquarium body 1 or the threaded lid 8 of the socket 4 is removed from the socket 4 while the aquarium body 1 is placed so that the socket is upward, to thereby detach the aquarium body 1 from the device.

As can be seen from the foregoing, the sealed-type aquarium device of the present invention is constructed in an air-tight and water-tight manner except the portion of the aquarium body to which the pipes for connecting the aquarium body and filtering unit to each other are joined, so that the aquarium body 1 may be fully filled with water without leaving any air space therein, unlike the conventional aquarium tank. Also, this permits a viewer to regard the aquarium body as a solid glass ball, a solid crystal ball or the like. Further, the present invention is constructed so as to forcibly circulate water between the aquarium body and the filtering unit through the feed and drainage pipes. Such construction effectively prevents water from overflowing or flowing backward, so that the aquarium body may be installed in any desired orientation at any desired location, which is never considered with respect to the prior art, and there is created a view as if fish are swimming in a solid crystal ball. Thus, it will be noted that the aquarium device of the present invention creates a marvelous and/or strange atmosphere sufficient to fascinate a viewer.

Further, the present invention is so constructed that the aquarium body and filtering unit are arranged in proximity to each other or remote from each other through the feed and drainage pipes each made of a rigid material or a soft and flexible material, resulting in the above-described advantages of the present invention being further promoted.

In addition, in the present invention, the aquarium body is provided with the sealing lid or socket, to thereby facilitate installation and maintenance of the aquarium body.

Also, the filtering unit is provided therein with the aeration such as the air-stone means to ensure that all polluted water returned to the filtering unit through the drainage pipe is effectively subject to aeration, resulting in it being positively cleaned or purified and causing a sufficient amount of air to be contained in the water, thus, the water is kept constantly suitable for raising fish for enjoyment for a long period of time without being renewed.

Further, the feed pipe is provided with the bait feeding section, so that a bait in the form of, for example, particles may be readily supplied to the aquarium body irrespective of the aquarium body being sealedly constructed.

Also, the present invention permits a water pressure in the aquarium body to be adjusted by controlling the flow control valve provided on the drainage pipe and controlling the water feed rate of the feed pump to suitably control a ratio of the discharge rate of water to the filtering unit through the drainage pipe to the feed rate of water to the aquarium body through the feed pipe. For example, an increase in water pressure in the aquarium body may be accomplished by increasing the feed rate of cleaned water and decreasing the discharge rate of polluted water, so that the aquarium device of the present invention not only may provide a water pressure suitable for raising a deep-sea fish such as a sea bream, but may be used as a pressurized experimental water tank for studying an effect of a variation in water pressure on fish.

As described above, the aquarium body may be provided therein with the illumination means and the decorative or display articles. Thus, the aquarium device of the present invention permits the decorative or display articles and fish to be clearly and beautifully visualized by means of the illumination. This aquarium display exhibits fish for enjoyment, but also provides a novel decorative effect which can be used for advertising or propaganda display.

The aquarium body of a spherical shape which is filled with water is observed just like a solid glass ball, a solid crystal ball or the like and exhibits a function like a convex lens, so that the decorative or display articles and fish received in the aquarium body may be fantastically observed as if they are encapsulated in a solid glass ball or crystal ball, as well as in an enlarged manner.

Moreover, the aquarium body of a panel-like shape may be fitted in a picture frame or mounted on an indoor wall, to thereby function as an interior decoration.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A sealed-type aquarium device comprising:
a hermetically sealed aquarium body with sufficient structural rigidity to withstand pressures above atmospheric pressure;
a filtering unit for purifying water by filtration, said filtering unit being arranged separate from said aquarium body and including a feed pump;
a feed pipe and a drainage pipe each arranged between said aquarium body and said filtering unit for connecting said aquarium body and filtering unit to each other therethrough,
said feed pump permitting water purified through said filtering unit to be fed through said feed pipe to said aquarium body under pressure, to thereby increase a water pressure in said aquarium body to a degree sufficient to cause water polluted in said aquarium body to be forcibly discharged from said aquarium body through said drainage pipe to said filtering unit, resulting in water being circulated through said aquarium device while being filtered;
wherein said aquarium body is provided with a socket equipped with a coupling means, said socket comprising a short cylinder communicating with the interior of said aquarium body and said short cylinder is provided with a threaded portion at a distal end thereof; and
said socket includes a threaded lid provided with said coupling means;
said feed pipe and drainage pipe being connected to said aquarium body through said coupling means;
said threaded lid being threadedly connected to said threaded portion of said short cylinder.

2. A sealed-type aquarium device, comprising:
a hermetically sealed aquarium body;
a filtering unit for purifying water by filtration, said filtering unit being arranged separate from said aquarium body and including a feed pump; and
a feed pipe and a drainage pipe each arranged between said aquarium body and said filtering unit for connecting said aquarium body and filtering unit to each other therethrough,
said feed pump permitting water purified through said filtering unit to be fed through said feed pipe to said aquarium body under pressure, to thereby increase a water pressure in said aquarium body to a degree sufficient to cause water polluted in said aquarium body to be forcibly discharged from said aquarium body through said drainage pipe to said filtering unit, resulting in water being circulated through said aquarium device while being filtered; and
wherein said feed pipe is provided with a bait feeding section, said bait feeding section comprising a branch pipe provided at said feed pipe, on-off valves arranged at said feed pipe so as to interpose said branch pipe therebetween, and a three-way valve provided at said branch pipe.

3. A sealed-type aquarium device comprising:
a hermetically sealed aquarium body with sufficient structural rigidity to withstand pressures above atmospheric pressure;
a filtering unit for purifying water by filtration, said filtering unit being arranged separate from said aquarium body and including a feed pump;
a feed pipe and a drainage pipe each arranged between said aquarium body and said filtering unit for connecting said aquarium body and filtering unit to each other therethrough,
said feed pump permitting water purified through said filtering unit to be fed through said feed pipe to said aquarium body under pressure, to thereby increase a water pressure in said aquarium body to a degree sufficient to cause water polluted in said aquarium body to be forcibly discharged from said aquarium body through said drainage pipe to said filtering unit, resulting in water being circulated through said aquarium device while being filtered;
wherein said feed pipe and drainage pipe each are provided with a flow control valve;
said flow control valves and feed pump being controlled to adjust a ratio of the water feed rate to said aquarium body to the water discharge rate from said aquarium body, to thereby control a water pressure in said aquarium body.

4. A sealed-type aquarium device comprising:

a hermetically sealed aquarium body with sufficient structural rigidity to withstand pressures above atmospheric pressure;

a filtering unit for purifying water by filtration, said filtering unit being arranged separate from said aquarium body and including a feed pump;

a feed pipe and a drainage pipe each arranged between said aquarium body and said filtering unit for connecting said aquarium body and filtering unit to each other therethrough, said feed pump permitting water purified through said filtering unit to be fed through said feed pipe to said aquarium body under pressure, to thereby increase a water pressure in said aquarium body to a degree sufficient to cause water polluted in said aquarium body to be forcibly discharged from said aquarium body through said drainage pipe to said filtering unit, resulting in water being circulated through said aquarium device while being filtered;

wherein said aquarium body is provided with a socket equipped with a coupling means;

wherein said socket is provided therein with a light source, resulting in the interior of said aquarium body being illuminated.

5. A sealed-type aquarium device comprising:

a hermetically sealed aquarium body with sufficient structural rigidity to withstand pressures above atmospheric pressure;

a filtering unit for purifying water by filtration, said filtering unit being arranged separate from said aquarium body and including a feed pump;

a feed pipe and a drainage pipe each arranged between said aquarium body and said filtering unit for connecting said aquarium body and filtering unit to each other therethrough, said feed pump permitting water purified through said filtering unit to be fed through said feed pipe to said aquarium body under pressure, to thereby increase a water pressure in said aquarium body to a degree sufficient to cause water polluted in said aquarium body to be forcibly discharged from said aquarium body through said drainage pipe to said filtering unit, resulting in water being circulated through said aquarium device while being filtered;

wherein said aquarium body is provided with a socket equipped with a coupling means;

a light-permeable element inserted through said socket and having a distal end inside said aquarium body; and a light source arranged to direct light toward an outer end surface of said light-permeable element, said outer end surface being outside said aquarium body;

whereby light emitted from said light source is transmitted through said light-permeable element and discharged from said distal end of said light-permeable element to illuminate the interior of said aquarium body.

6. A sealed-type aquarium device as defined in claim 5, wherein said light-permeable element is made of a material selected from the group consisting of a transparent glass material and a transparent plastic material.

7. A sealed-type aquarium device as defined in claim 6, wherein said light-permeable element is formed into a shape selected from the group consisting of a solid bar-like shape, a solid plate-like shape and a solid wire-like shape.

8. A sealed-type aquarium device as defined in claim 5, wherein said aquarium body is provided therein with a hollow capsule adapted to receive a display article therein.

9. A sealed-type aquarium device, comprising:

a hermetically sealed aquarium body;

a filtering unit for purifying water by filtration, said filtering unit being arranged separate from said aquarium body and including a feed pump;

a feed pipe and a drainage pipe each arranged between said aquarium body and said filtering unit for connecting said aquarium body and filtering unit to each other therethrough, said feed pump permitting water purified through said filtering unit to be fed through said feed pipe to said aquarium body under pressure, to thereby increase a water pressure in said aquarium body to a degree sufficient to cause water polluted in said aquarium body to be forcibly discharged from said aquarium body through said drainage pipe to said filtering unit, resulting in water being circulated through said aquarium device while being filtered;

wherein said aquarium body is provided with one of a sealing lid and a socket equipped with a coupling means;

a light-permeable element inserted at the distal end surface thereof through said socket into said aquarium;

a light source arranged below the proximal end surface of said light-permeable element;

wherein said aquarium body is provided therein with a hollow transparent capable adapted to receive a display article therein;

wherein said hollow capsule is positioned above said light source; and whereby light emitted from said light source is transmitted through said light-permeable element and discharged from said distal end of said light-permeable element to illuminate the interior of said hollow transparent capsule.

10. A sealed-type aquarium device as defined in claim 9, wherein said hollow capsule is positioned above said distal end surface of said light-permeable element.

* * * * *